United States Patent
Römer

(10) Patent No.: US 10,081,281 B2
(45) Date of Patent: Sep. 25, 2018

(54) SEAT PAN FOR A VEHICLE SEAT, AND VEHICLE SEAT HAVING SUCH A SEAT PAN

(71) Applicant: Faurecia Autositze GmbH, Stadthagen (DE)

(72) Inventor: Bernd Römer, Minden (DE)

(73) Assignee: Faurecia Autositze GmbH, Stadthagen (DE)

( * ) Notice: Subject to any disclaimer, the term of this patent is extended or adjusted under 35 U.S.C. 154(b) by 302 days.

(21) Appl. No.: 14/823,451

(22) Filed: Aug. 11, 2015

(65) Prior Publication Data

US 2016/0185265 A1 Jun. 30, 2016

(30) Foreign Application Priority Data

Aug. 12, 2014 (DE) .................. 10 2014 111 486

(51) Int. Cl.
| | |
|---|---|
| *B60N 2/68* | (2006.01) |
| *B60N 2/02* | (2006.01) |
| *B60N 2/427* | (2006.01) |
| *B60N 2/54* | (2006.01) |
| *B60N 2/70* | (2006.01) |

(52) U.S. Cl.
CPC .......... *B60N 2/686* (2013.01); *B60N 2/0232* (2013.01); *B60N 2/42709* (2013.01); *B60N 2/54* (2013.01); *B60N 2/68* (2013.01); *B60N 2/7094* (2013.01)

(58) Field of Classification Search
CPC .............................. B60N 2/7094; B60N 2/686
See application file for complete search history.

(56) References Cited

U.S. PATENT DOCUMENTS

| | | | |
|---|---|---|---|
| 4,189,180 A | 2/1980 | Klein | |
| 4,368,917 A | 1/1983 | Urai | |
| 5,284,381 A * | 2/1994 | Aoki | B60N 2/68 |
| | | | 297/452.1 |
| 7,172,253 B2 | 2/2007 | Haverkamp | |

(Continued)

FOREIGN PATENT DOCUMENTS

| | | |
|---|---|---|
| CN | 201158323 | 12/2008 |
| DE | 29 52 499 | 7/1980 |

(Continued)

OTHER PUBLICATIONS

EP Office Action dated Jan. 20, 2016, EP 15 00 2231; Faurecia Autositze GmbH (6 pages).

(Continued)

*Primary Examiner* — David R Dunn
*Assistant Examiner* — Tania Abraham
(74) *Attorney, Agent, or Firm* — Shlesinger, Arkwright & Garvey LLP

(57) ABSTRACT

Seat pan for fastening to a seat frame of a vehicle seat. The seat pan has a profile structure made up of multiple profiles, and on its bottom side has crossbeam receptacles, preferably tube receptacles which are open at the bottom, for placement on a crossbeam, in particular a transverse tube of the seat frame, which extends in the transverse direction. The seat pan is preferably injection-molded from a plastic material, wherein through holes which extend through the profile structure in the vertical direction are formed between the profiles, preferably between all profiles.

19 Claims, 8 Drawing Sheets

(56) References Cited

U.S. PATENT DOCUMENTS

| | | |
|---|---|---|
| 7,172,255 B2 | 6/2007 | Wanke |
| 7,273,243 B2 | 9/2007 | Prugarewicz |
| 7,278,689 B2 | 10/2007 | Guillouet |
| 7,278,690 B2 | 10/2007 | Bej |
| 7,390,059 B2 | 6/2008 | Brockschnieder et al. |
| 7,390,063 B2 | 6/2008 | Behrens |
| 7,410,219 B2 | 8/2008 | Kraft et al. |
| 7,416,254 B2 | 8/2008 | Jennings |
| 7,425,038 B2 | 9/2008 | Deptolla |
| 7,461,900 B2 | 12/2008 | Lange |
| 7,479,749 B2 | 1/2009 | Gerding et al. |
| 7,490,900 B2 | 2/2009 | Szczudrawa |
| 7,506,939 B2 | 3/2009 | Brockschnieder et al. |
| 7,517,022 B2 | 4/2009 | Habedank et al. |
| 7,673,944 B2 | 3/2010 | Behrens |
| 7,746,011 B2 | 6/2010 | Gerding et al. |
| 7,794,021 B2 * | 9/2010 | Sahashi ............... B60N 2/7094 297/452.49 |
| 8,662,483 B2 * | 3/2014 | Yamaguchi ............ B60N 2/002 267/102 |
| 8,950,782 B2 | 2/2015 | Dobruia et al. |
| 2004/0075404 A1 | 4/2004 | Gerding et al. |
| 2006/0055224 A1 | 3/2006 | Wanke |
| 2006/0061184 A1 | 3/2006 | Jennings |
| 2006/0108491 A1 | 5/2006 | Behrens |
| 2006/0119158 A1 | 6/2006 | Haverkamp |
| 2006/0138842 A1 | 6/2006 | Behrens |
| 2006/0163932 A1 | 7/2006 | Bej |
| 2006/0175887 A1 | 8/2006 | Behrens |
| 2006/0214485 A1 | 9/2006 | Brockschnieder et al. |
| 2006/0237986 A1 | 10/2006 | Brockschnieder et al. |
| 2006/0261661 A1 | 11/2006 | Kraft et al. |
| 2006/0290188 A1 | 12/2006 | Guillouet |
| 2007/0013212 A1 | 1/2007 | Meister |
| 2007/0063565 A1 | 3/2007 | Habedank et al. |
| 2007/0069561 A1 | 3/2007 | Schnabel et al. |
| 2007/0096668 A1 | 5/2007 | Gerding et al. |
| 2007/0108824 A1 | 5/2007 | Lange |
| 2007/0126272 A1 | 6/2007 | Deptolla |
| 2007/0222263 A1 | 9/2007 | Szczudrawa |
| 2011/0044753 A1 * | 2/2011 | Kotaki ................. B60N 2/7041 403/235 |
| 2012/0187740 A1 | 6/2012 | Kim |
| 2012/0241999 A1 | 9/2012 | Kröner |
| 2013/0009442 A1 * | 1/2013 | Burnham ................ B60N 2/68 297/452.18 |
| 2013/0119715 A1 * | 5/2013 | Medoro ................ B60N 2/686 297/180.1 |
| 2013/0119742 A1 * | 5/2013 | Wiegelmann ........... B60N 2/54 297/452.18 |
| 2013/0278041 A1 * | 10/2013 | Matsumoto .......... B60N 2/7094 297/452.49 |
| 2013/0313876 A1 * | 11/2013 | Perrin ..................... B60N 2/24 297/344.13 |
| 2014/0062158 A1 * | 3/2014 | Line ..................... B60N 2/2356 297/378.1 |
| 2014/0175851 A1 * | 6/2014 | Leuchtmann ....... B60N 2/7094 297/452.18 |
| 2014/0225407 A1 * | 8/2014 | Nagayasu ................ B60N 2/14 297/344.1 |

FOREIGN PATENT DOCUMENTS

| | | |
|---|---|---|
| DE | 20 2006 001 256 U1 | 7/2007 |
| DE | 20 2007 000 484 U1 | 6/2008 |
| DE | 20 2007 008 310 U1 | 11/2008 |
| DE | 20 2008 011 499 U1 | 1/2009 |
| DE | 10 2009 040 901 A1 | 3/2011 |
| DE | 10 2011 002 079 A1 | 10/2012 |
| DE | 10 2012 103 919 A1 | 4/2013 |
| EP | 0372338 A2 * | 6/1990 ............... B60N 2/68 |
| EP | 2 666 663 A2 | 11/2013 |
| FR | 2 813 826 | 3/2002 |
| KR | 1996-0014880 | 10/1996 |

OTHER PUBLICATIONS

CN Office Action dated Mar. 3. 2017; Application No. 201510492540.0; Faurecia Autositze GmbH (13 pages).

KR First Office Action dated Aug. 23, 2016, Appliction No. 10-2015-0113681, Faurecia Autositze GmbH (6 pages).

KR Second Office Action dated Mar. 31, 2017, Appliction No. 10-2015-0113681, Faurecia Autositze GmbH ; (6 pages).

DE Office Action dated Apr. 13, 2015 in related DE 20 2014 111 486.8 (6 pages).

* cited by examiner

SEAT PAN FOR A VEHICLE SEAT, AND VEHICLE SEAT HAVING SUCH A SEAT PAN

CROSS-REFERENCE TO RELATED APPLICATIONS

This application claims the priority of German Application No. 10 2014 111 486.8, filed Aug. 12, 2014, and which is incorporated herein by reference.

FIELD OF THE INVENTION

The invention relates to a seat pan for a vehicle seat, and a vehicle seat of this type. More particularly, the invention relates to a seat pan for a vehicle seat, and a vehicle seat having such a seat pan.

BACKGROUND OF THE INVENTION

Vehicle seats generally have a seat frame which is fastened to a length-adjustable top rail, for example, and a seat pan which is fastened to the seat frame, the seat frame being height-adjustable, for example. For example, cushions and comfort apparatuses such as a seat pan heater and massage apparatuses may be mounted on the seat pan.

Seat pans which are to be fixedly mounted on the seat frame as well as seat pans which are adjustable with respect to the seat frame, in particular tilt-adjustable seat pans for improving seat comfort, are known. The seat pan generally has a sufficiently rigid design to provide a high level of crash safety; it may be formed, for example, by side profiles and transverse tubes which connect the side profiles, thus providing high rigidity.

EP 2 666 663 A1 describes a seat pan or seat shell which is designed as a continuous plastic part having a plurality of slots, and which is placed from above onto a seat cushion structure.

DE 10 2009 040 901 A1 describes a seat pan or seat shell which is formed from a glass fiber-reinforced plastic material, the seat pan having a continuous seat surface with a fan structure, made up of ribs for reinforcement, provided on the bottom side.

However, those types of seat pan constructions are relatively heavy and must be designed with a high level of material expenditure in order to have sufficient strength and rigidity along with a high degree of seat comfort.

OBJECTS AND SUMMARY OF THE INVENTION

An object of the invention is to provide a seat pan for a vehicle seat which may be provided with relatively little effort and which ensures a high level of safety.

This object is achieved by a seat pan according to the invention, and a seat part arrangement according to the invention, and a seat including a seat pan according to the invention. Various preferred further embodiments according to the invention are detailed herein.

According to the invention, the seat pan thus has a profile structure; it is advantageously designed completely as a profile structure, with through holes advantageously provided between the individual profiles. The profiles may, for example, intersect or merge into one another.

The rigidity of the profile structure is increased significantly due to the shaping of the profile cross sections, in particular in the vertical direction, for example as a T, U, double T, or Z profile.

A design is thus possible which is lightweight and inexpensive, with few material requirements. The seat pan is designed for placement on a seat frame.

It is advantageous to provide only one profile structure instead of complete seat shell surfaces. According to the invention, it is recognized here that this type of profile structure is sufficient for accommodating a cushion or foam body.

A particular advantage of the design according to the invention lies in its suitability for absorbing specific stresses while having low weight or low mass.

A relevant first stress is crash safety in a head-on collision, in which the seat occupant together with the seat pan is accelerated in the forward direction. The seat pan is thus exposed to high stresses here. Due to the seat pan being designed according to the invention as a profile structure in order to be suspended, mounted, or clipped in a crossbeam of the seat frame, in particular a transverse tube, it is designed from the outset to not single-handedly bear these stresses during a head-on collision.

It is hereby recognized according to the invention that it is advantageous to adapt the seat pan to the stresses on the crossbeam, thus avoiding double rigidities or double structures for intercepting the stresses; it is recognized that during the head-on collision, the transverse tube of the seat frame bends forward, or forward and downward, in its middle area, and at its side attachments is held on the other parts of the seat frame, in particular the longitudinal beams or longitudinal profiles of the seat profile. The seat pan is able to complete this motion; since it is designed as a profile structure, it has a suitable deformation reserve or "softness" but still has sufficient rigidity, so that it yields together with the bending transverse tube. The deformability of the seat pan is thus adapted to the transverse tube. Therefore, the seat pan also does not break, which could occur with a lack of resilience or higher rigidity in the case of the bending transverse tube.

The seat pan is advantageously particularly flexible in its middle area (in relation to the transverse direction), for example due to a material reduction, in particular a material reduction in the vertical direction, or also due to a suitably soft profile cross section, so that the seat pan is able to yield together with the transverse tube during a head-on collision. Therefore, the stability under vertical stress, in particular in the case of the knees, is advantageously not impaired.

Redundant rigidity against the stresses in a head-on collision is thus avoided.

To this end, the seat pan is advantageously placed in a positive-fit or snap-locking manner on a front transverse tube of the seat frame through tube receptacles, which are open or semi-open at the bottom, provided on the bottom side of the seat pan. The tube receptacles may be formed, for example, on the bottom side of longitudinal profiles which extend in the longitudinal direction, and may allow, for example, clipping or detachable snapping into the front transverse tube.

The transverse tube may thus be accommodated by clipping or snapping in, or may also be injected into the profile structure.

Another stress on the seat pan is an improper, point-specific, or area-specific stress on the seat occupant supported on the seat pan. This stress is in particular a so-called "knee stress," in which the user is supported on the seat pan with one knee, for example in order to adjust the head restraint or to hand something back to the rear of the vehicle. Fairly large stresses may also occur, for example, when the seat occupant is handing something back, for example, to a passenger, such as a child, sitting on a rear seat bench or benchseat, or wants to make an adjustment to that passenger's seat. The entire weight of the user may thus possibly be supported by the user's knee on the seat pan, for example in a front area of the seat pan, resulting in a high level of point-specific or area-specific stress.

These types of stresses on the seat pan are intercepted by the profile structure as stresses about the transverse axis, the profile structure having a particularly rigid design with respect to such vertical stresses; the profile structure may thus intercept the stresses in particular with its outer reinforcing circumferential profile.

The seat pan may be made completely of plastic, in particular as an injection-molded part, i.e., in particular also without supporting metallic structural parts; however, the circumferential bracket, for example, may also have a metallic support which in particular is injected. The seat pan advantageously does not have a continuous surface on its top side, but instead represents only one profile structure, with corresponding through holes provided between the profiles.

The individual profiles are advantageously formed in each case with a profile cross section used for reinforcement, in particular designed as a T profile, double T (I profile), Z profile, or U profile. Thus, in particular an outer circumferential profile is formed, completely or at least in areas, as a U profile or Z profile which advantageously is open at the bottom, so that the seat pan with its outer circumferential profile may be placed from above into structural parts, for example outer side profiles of the seat frame. The longitudinal profiles and at least the front transverse profiles may be designed as a T profile, I profile, or Z profile, for example; a rear transverse profile advantageously has a thicker design, and at its end merges into lateral leg areas of the outer circumferential profiles. High strength with low weight is thus achieved by a frame-like profile structure of the seat pan.

The seat part arrangement to be mounted on the seat frame advantageously also has, in addition to the seat pan, a subsuspension having multiple springs and a rear subsuspension fastening. The springs of the subsuspension may thus be mounted between a rear end of the seat pan and the subsuspension fastening.

The subsuspension fastening, for example with front tube receptacles which are open or semi-open at the bottom, is placed on and clipped into a front transverse tube of the seat frame.

Different designs are possible for adjustable and nonadjustable seat pans. For a design of a nonadjustable, i.e., fixed, seat pan, in principle a rigid connection between the seat pan and the rear subsuspension fastening is not necessary, so that these are separate from one another or connected solely via the springs of the subsuspension, and in each case may be separately mounted or suspended on the seat frame, for example in rear transverse profiles.

For a design of a seat pan which is adjustable with respect to the seat frame, for example pivotable in the front area, the seat pan is preferably rigidly connected to the rear subsuspension fastening, for example by designing it as a one-piece plastic part, in particular an injection-molded part. The seat pan may thus have a one-piece design with the subsuspension fastening, for example as a profile structure, wherein the springs of the subsuspension are suspended in this structure. For adjustment, a manual adjustment device or a motorized adjustment device, for example, may be provided, for example on the bottom side of the seat pan, for example with an eccentric adjustment, which are known per se for seat pan adjustments.

The seat pan springs thus extend in the longitudinal direction between the seat pan and the rear subsuspension fastening. At their ends they may be injected into the plastic material of the rear subsuspension fastening. As an alternative to injecting the seat pan springs, they may also be suspended in each case.

The seat pan springs may extend in particular in a meandering manner or with a deformation reserve. To avoid lateral shifting under stress, the seat pan springs are advantageously fixed relative to one another by cross-connections; the cross-connections may, for example, be rods, once again made of a plastic material, for example, which extend in the transverse direction and which are adjustably mounted on the seat pan springs. The cross-connections are advantageously not connected to the seat pan and are thus able to deflect, whereby they ensure only the transverse distances between the springs of the subsuspension, and thus do not hinder deflection. High elasticity and a high level of seat comfort are ensured by the metallic subsuspension springs.

Relative terms such as left, right, up, and down are for convenience only and are not intended to be limiting.

BRIEF DESCRIPTION OF THE DRAWINGS

The invention is explained in greater detail below with reference to the accompanying drawings, which show the following.

DETAILED DESCRIPTION OF THE INVENTION

Figure 5:
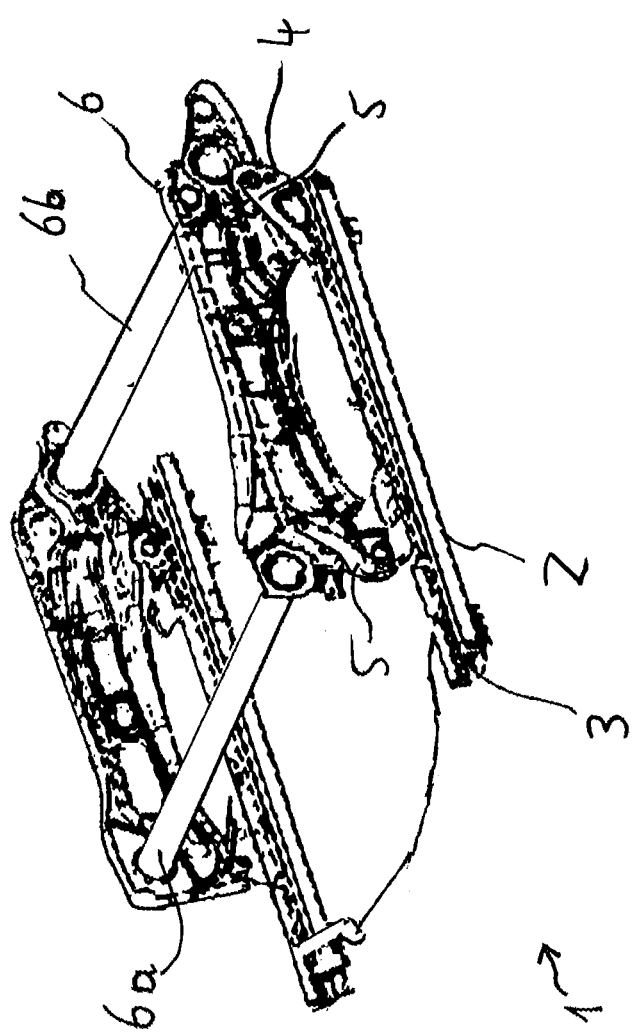
FIG. 5 shows the seat frame of a vehicle seat for accommodating the seat part arrangement from FIGS. 1 to 4.

According to FIG. 5, a vehicle seat 1 has a bottom rail 2 which is to be mounted on the vehicle chassis, for example, and a top rail 3 which is accommodated in the bottom rail 2 in a length-adjustable manner, and on which a seat frame 4 is mounted, which in particular makes height adjustment possible, for example via a height adjustment mechanism having rockers 5. In its top area, the seat frame 4 has side profiles 6c, 6d which extend in the longitudinal direction, as well as a front transverse crossbeam, in particular a front transverse tube 6a and a rear transverse crossbeam, in particular a rear transverse tube 6b which are accommodated between the side profiles 6c, 6d. The side profiles 6c, 6d together with the transverse tubes 6a and 6b, as part of the seat frame 4, are thus height-adjustable with respect to the top rails 3.

Figure 1:
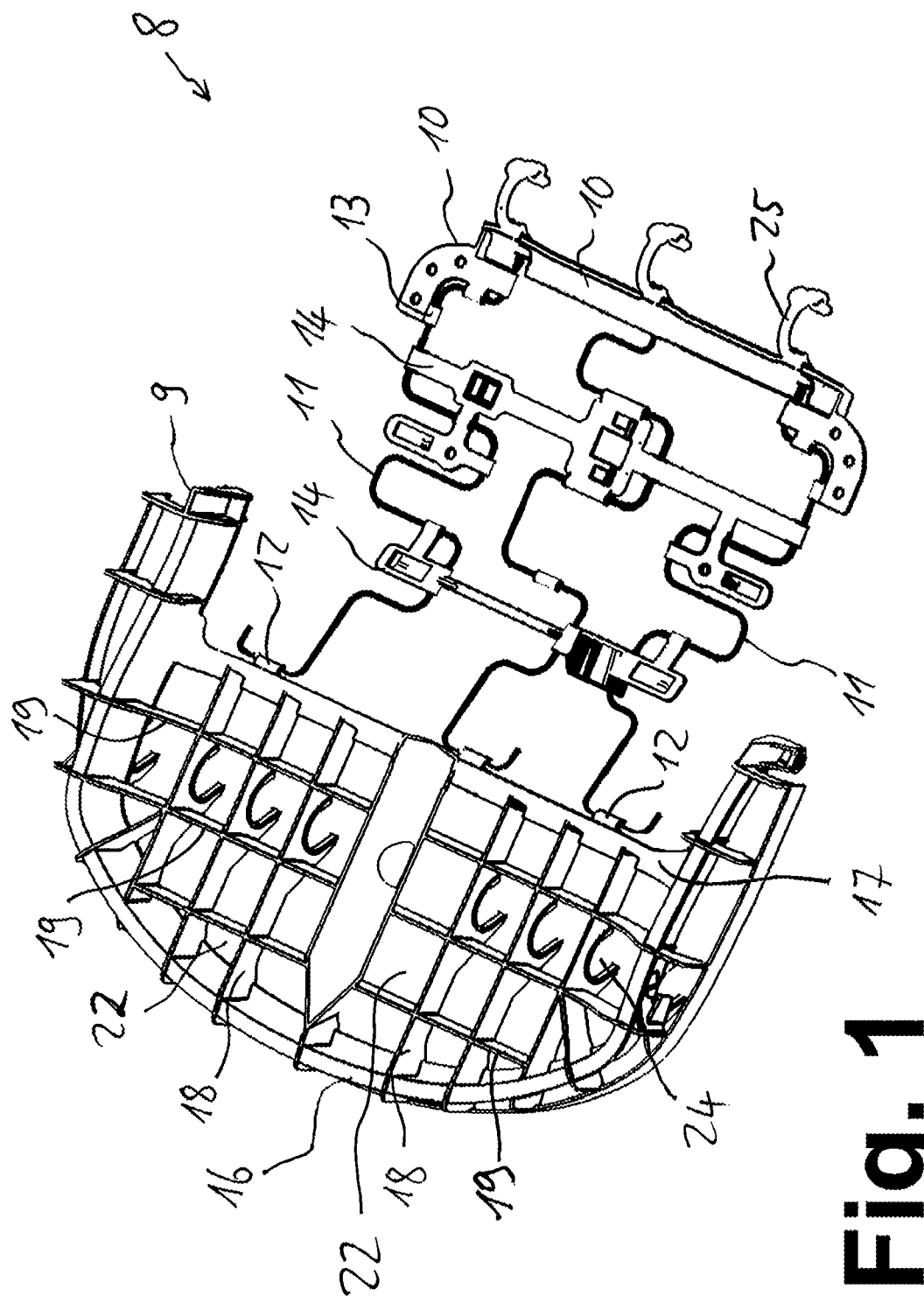
FIG. 1 shows a seat part arrangement according to a first embodiment for a rigid connection to a seat frame, in a perspective view.
Figure 2:
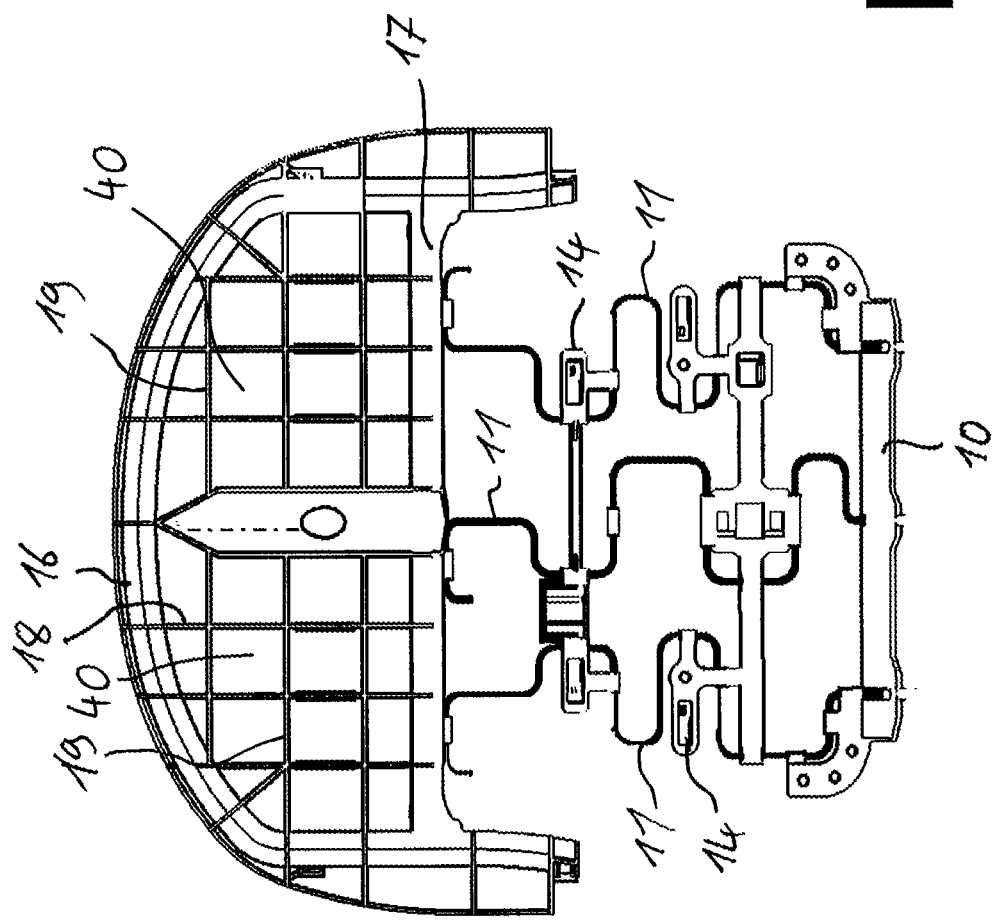
FIG. 2 shows a top view of the seat part arrangement from FIG. 1.
Figure 3:
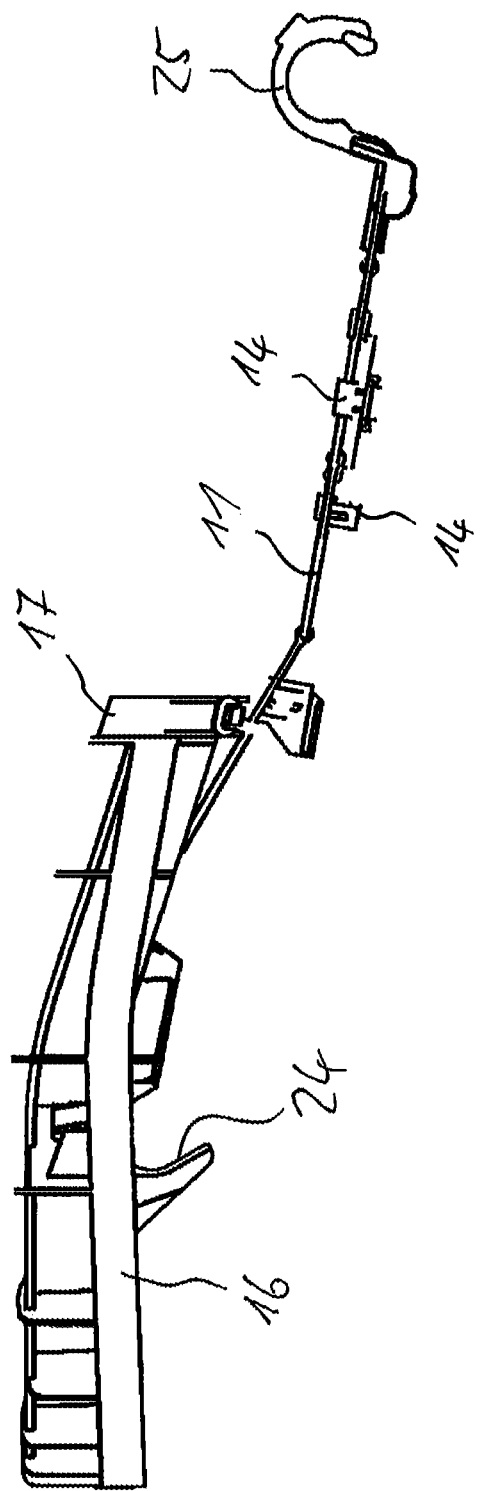
FIG. 3 shows a side view of the seat part arrangement from FIGS. 1 and 2.

A seat part arrangement 8 shown in FIGS. 1 to 3 has a seat pan 9 and a subsuspension 3, the subsuspension 3 in turn having a subsuspension fastening 10, and subsuspension springs 11 which are mounted between the seat pan 9 and the subsuspension fastening 10 and which extend in the longitudinal direction.

The seat part arrangement 8 is accommodated on the transverse tubes 6a, 6b and the side profiles 6c, 6d, and is thus adjusted in height by the seat frame 4.

The subsuspension springs 11 are designed, for example, as wires, for example steel wires, which are meandering or provided with a deformation reserve; each subsuspension spring with its front end is suspended in a front spring holder 12 of the seat pan 9, and with its rear end is suspended in rear spring holders 13 of the subsuspension fastening 10. For transverse stabilization of the three meandering subsuspension springs 11 having the deformation reserve, spacers (spring retainers) 14 are provided which are used to prevent lateral yielding of the seat pan springs 11 under stress, and thus to ensure the transverse position of the seat pan springs 11, even under different stress conditions.

The seat pan 9 is manufactured as an injection-molded part made of a plastic material that is suitable for an injection molding process. The seat pan 9 is designed as a profile structure having multiple profiles 16, 17, 18, 19 which may, for example, intersect or merge into one another. Through holes 22 which are continuous in the vertical direction or Z direction are advantageously formed between the profiles 16, 17, 18, 19.

The profile structure advantageously has only the profiles 16, 17, 18, 19, so that no surface material covers the through holes 22.

The subsuspension fastening 10 may also be designed as a plastic injection-molded part. The spring retainers 14, which are used as cross-connections, may be designed as plastic parts or also as metal parts.

According to the embodiment shown, the subsuspension springs 11 are suspended in the seat pan 9; however, they may also be injected into the plastic material of the seat pan 9. In addition, the fastening of the subsuspension springs 11 to the spring retainers (cross-connections) 14 and to the subsuspension fastening 10 may take place as a mechanical mounting or by suspension, or also by injection.

According to the design shown, the profile structure of the seat pan 9 has:

an outer circumferential profile 16 which forms a closure of the seat pan 9 at the front and sides, a rear transverse profile 17 which extends between the two outer legs of the bracket-shaped outer circumferential profile 16 and which is used for connecting the subsuspension springs 11, in addition to longitudinal profiles 18 which extend between the outer circumferential profile 16 and the rear transverse profile 17, and further transverse profiles 19 which extend essentially in parallel to the rear transverse profile 17, wherein the further transverse profiles 19 and the longitudinal profiles 18 intersect in this embodiment, thus forming a lattice structure. For accommodating the front transverse tube 6a, crossbeam receptacles or tube receptacles 24 are provided in the longitudinal profiles 18, for example, in particular as circular openings which are open at the bottom or open diagonally at the bottom, and into which the front transverse tube 6a may be clipped. For accommodating the rear transverse tube 6b, rear tube receptacles 25, in the present case designed as rearwardly extending, curved brackets, and which once again are open at the bottom, are correspondingly formed on the subsuspension fastening 10.

The profile structure design of the seat pan 9 as an injection-molded part is very material-conserving, lightweight, and inexpensive; the design of the overall seat part arrangement 8 is also material-conserving, since the seat pan 9 and the subsuspension fastening 10 are not rigidly connected to one another.

The profiles 16, 17, 18 and 19 may have a cross-sectional design in particular as a Z, T, or U profile, and thus in each case have a certain widening on their top side in order to provide a sufficiently flat support for a seat cushion to be accommodated.

Figure 4:
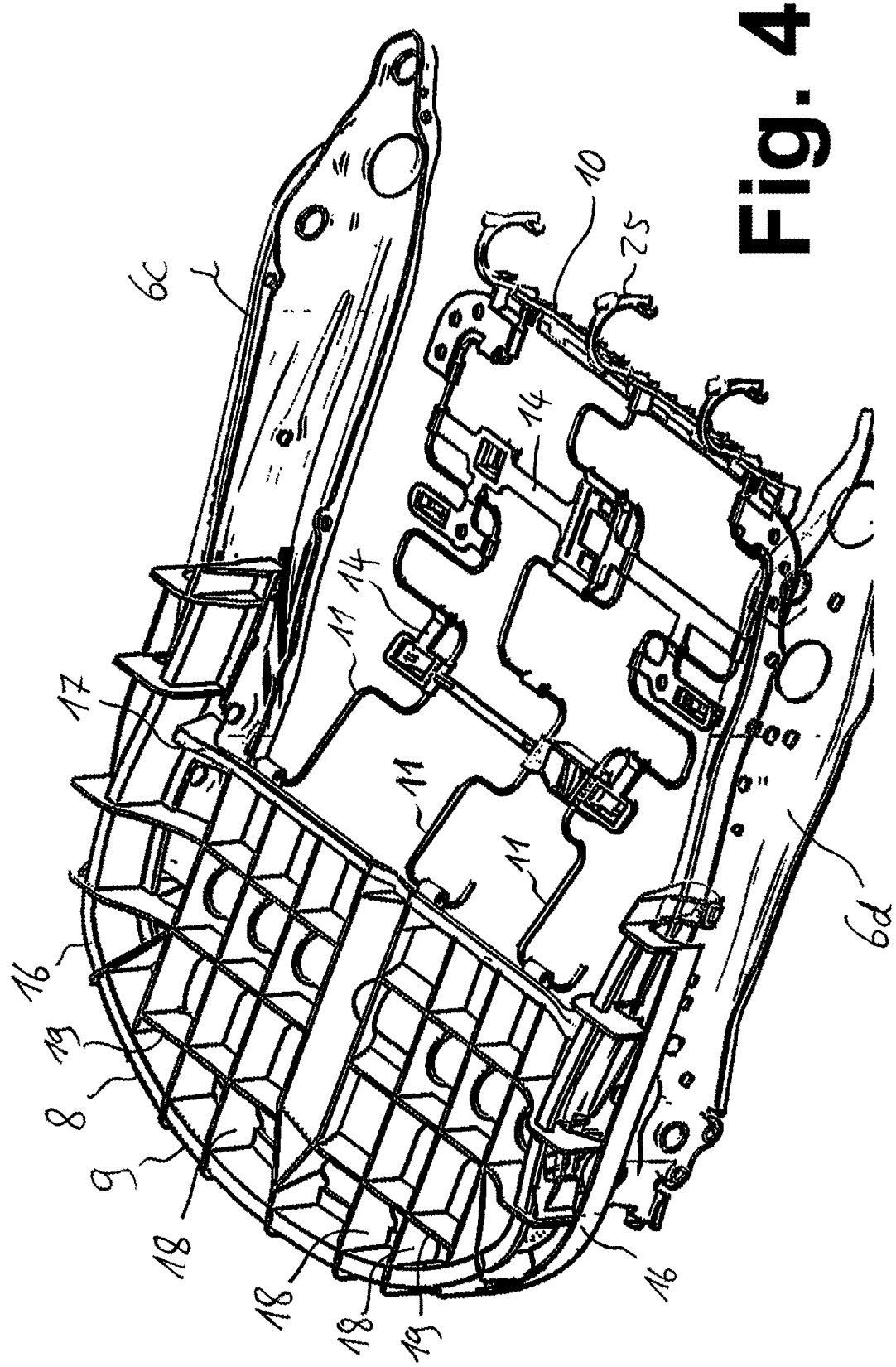
FIG. 4 shows the seat part arrangement of the embodiment in FIGS. 1 to 3 when mounted on a seat frame.

The individual profiles may have a shape that is suitable for the particular stress:

Thus, an outer circumferential profile 16 may be designed as a U profile or Z profile that is open at the bottom, so that the two lateral leg areas of the outer circumferential profile 16 may be pressed into or placed on the side profiles 6c, 6d of the seat frame 4, as is apparent in particular from FIG. 4. A U profile, optionally also a V profile, having an orientation that is open at the bottom thus allows a high level of flexural strength, in addition to accommodation by mounting from above, as well as a high support surface for a seat cushion at the top.

The other profiles 17, 18 and 19 may in turn be designed with high rigidity and further suitable properties. An L profile having an upwardly pointing transverse leg (inverted L), a T profile, and a Z profile in turn have a high support surface on their top side, with suitable flexural strength. An I profile having a vertically extending web is correspondingly used for reinforcement. A V profile allows a high level of flexibility. A Z profile is provided in particular with a vertical center web, in particular in the outer curves of the seat pan 9.

A flexible area 40 which, for example, in each case lies inwardly against the circumferential profile 16 is advantageously situated between the arc-shaped or bracket-shaped circumferential profile 16 and the inner profiles, in particular the longitudinal profiles 18 extending in the longitudinal direction and the transverse profiles 19 extending in the transverse direction. The flexible area 40 may thus be formed in particular by a V profile, or a horizontal I profile which thus extends horizontally in its middle area, and/or by a material weakening, for example, in the vertical direction, and in particular may act as a plastic hinge.

In the event of a head-on collision, the seat occupant together with the seat pan 9 is accelerated in the forward direction. The front transverse tube 6a at the sides is fixedly accommodated in the side profiles 6c, 6d of the seat frame 4, for example inserted in a positive-fit manner and welded, so that it does not come loose here. Under the high longitudinal stress, the transverse tube 6a therefore bends forward in its middle area due to the inertia of the mass of the body and of the seat pan 9, whereby the entire seat pan 9 likewise deforms in such a way that the tube receptacles 24 remain on the front transverse tube 6a, and complete the deformation movement of the front transverse tube 6a. The flexible area 40 within the circumferential profile 16 therefore yields; the circumferential profile 16 remains fixedly accommodated in the seat frame 4, in particular on the side profiles 6c, 6d.

The deformable seat pan 9 thus allows the fixed accommodation of the front transverse tube 6a even during a head-on collision, and does not come loose from the transverse tube 6a or from the side profiles 6c, 6d.

In contrast, the profile design for a point-specific stress on the seat pan 9 from above, in particular in an area in the longitudinal direction in front of the transverse tube 6a, is sufficiently rigid, so that no deformations, or no lasting deformations, occur here. In particular a knee stress, in which a user is resting with one knee at a point on the seat pan 9 and, for example, bends to the rear in the vehicle to a rear seat row, may thus be accommodated by the profiles, in particular the circumferential profile 16, the longitudinal profiles 18, and the transverse profiles 19. This type of stress thus represents a bending stress about the transverse tube 6a, which may be easily intercepted here; the circumferential profile 16 remains inserted in the side profiles 6c, 6d, and the sufficiently rigid transverse profiles 19 and longitudinal profiles 18 absorb the stress.

Figure 6:
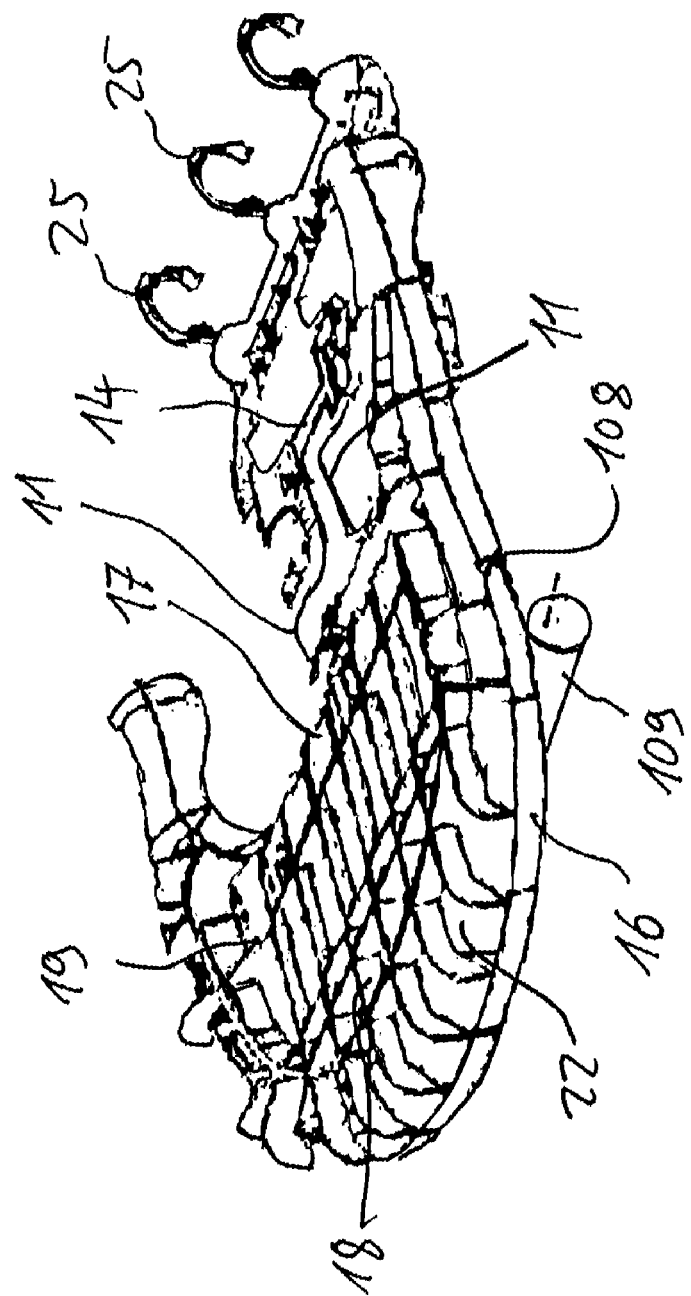
FIG. 6 shows a seat part arrangement according to another embodiment of a pivotable connection to a seat frame, in a perspective view.
Figure 7:
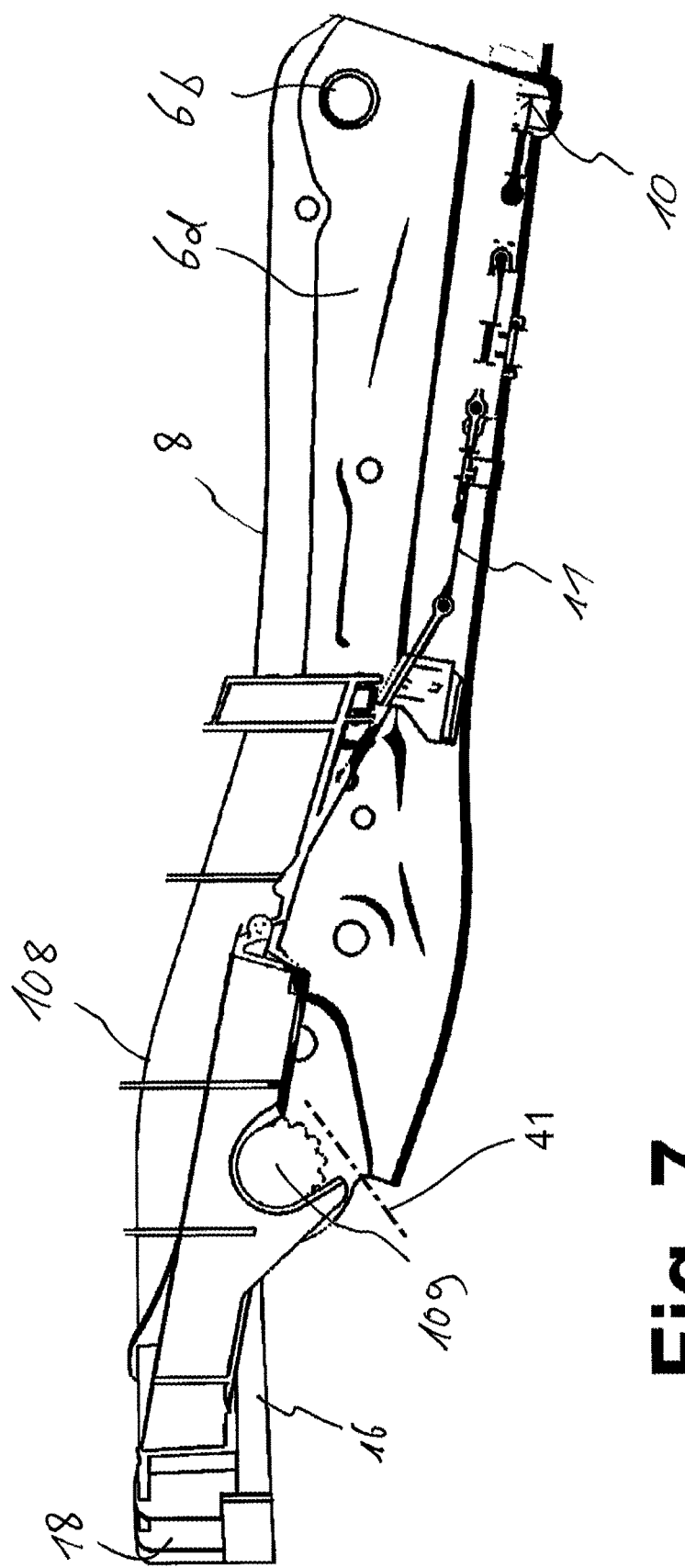
FIG. 7 shows a side view when the seat pan is accommodated on a seat frame.

According to the embodiment in FIG. 1, the seat pan 9 is separate from the other elements of the seat part arrangement 8. The embodiment in FIGS. 6 and 7 shows a one-piece seat part arrangement 108 which allows an adjustment of the seat pan 9 with respect to the seat frame 4. In this regard, the seat pan 9 may in particular be pivotable relative to the seat frame 4, thus achieving an improved comfort setting for users: An inclined adjustment of the seat part arrangement 108 with an accommodated cushion is possible in addition to the height adjustment by the seat frame 4. The seat part arrangement 108 in turn may in particular be fixedly suspended on the rear transverse tube 6b. The seat pan 9 may thus be pivoted, so that its height and inclination may be changed. A manual pivoting device, for example for operation by means of a lever or a cam, or also a motorized pivoting device 109 may be provided for this purpose, as shown, for example, in FIG. 7 with a cam which is to be mounted on the seat frame 4 and which allows a height adjustment of seat pan 9.

The seat pan 108 in this embodiment, but also the seat pan 8 according to the embodiment in FIGS. 1 to 4, may additionally be secured against lifting off at the top, in the present case by a securing device 41 below the cam of the motorized pivoting device 109, which may be a screw or a safety bolt, for example.

In this embodiment, the seat part arrangement 108 is thus designed as a one-piece profile structure, for example.

The transverse tube 6a may thus be adjusted with respect to other parts of the seat frame by the motorized pivoting device 9 or a manual pivoting device.

Figure 8:
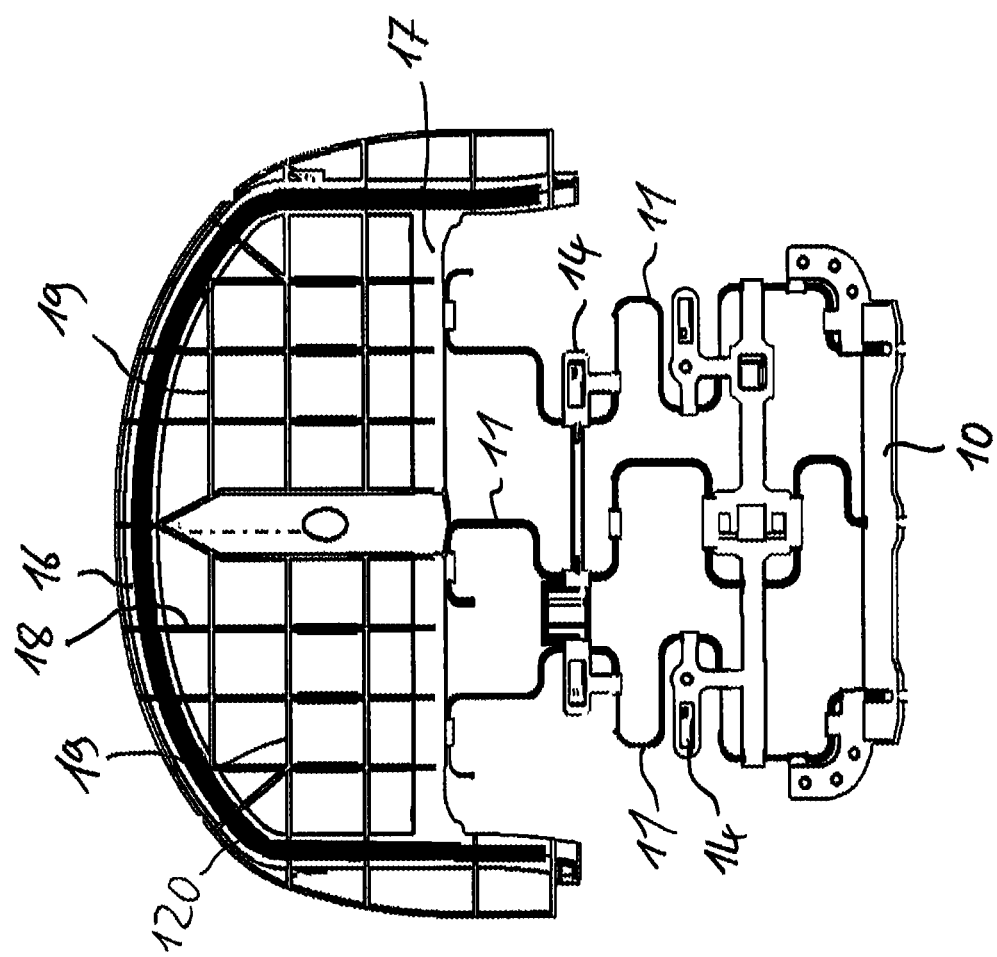
FIG. 8 shows a top view of a seat part arrangement according to a further embodiment.

FIG. 8 shows another embodiment in which a metallic support 120 is accommodated, in particular injected, in the circumferential profile 16. A profile structure having a high load capacity is thus achieved in a cost-effective manner.

It is contemplated that the circumferential profile is configured as a U profile that is open at the bottom, and preferably with a completely closed top side.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Seat pan for fastening to a seat frame of a vehicle seat, the seat pan comprising:
   a) a profile structure made up of multiple profiles;
   b) through holes are provided which extend through the profile structure in the vertical direction and which are formed between the multiple profiles;
   c) the seat pan having a bottom side, a longitudinal direction, and a transverse direction, and the seat pan on its bottom side having crossbeam receptacles for placement on a crossbeam which extends in the transverse direction; and
   d) the multiple profiles include a rear transverse profile on which front spring connections are provided for accommodating subsuspension springs.

2. Seat pan according to claim 1, wherein:
   a) the seat pan is injection-molded from a plastic material.

3. Seat pan according to claim 1, wherein:
   a) the profile structure is formed solely from the multiple profiles and from through holes which are formed between the multiple profiles.

4. Seat pan according to claim 1, wherein:
   a) the crossbeam receptacles have a configuration that is open at the bottom for fitting onto the crossbeam.

5. Seat pan according to claim 4, wherein:
   a) the crossbeam receptacles are configured for snap-locking or clipping attachment to a front transverse crossbeam.

6. Seat pan according to claim 1, wherein:
   a) the multiple profiles include a circumferential profile which surrounds the seat pan on three sides and is configured for placement on side profiles of the seat frame; and
   b) the circumferential profile is configured as a U profile that is open at the bottom.

7. Seat pan according to claim 1, wherein:
   a) the multiple profiles include longitudinal profiles and transverse profiles, and a lattice structure is made up of the longitudinal profiles and transverse profiles, between which through holes are formed, and the lattice structure is provided between a circumferential profile and the rear transverse profile.

8. Seat pan according to claim 1, wherein:
   a) the multiple profiles each are configured as one of the following profiles: I profile, T profile, Z profile, L profile, U profile, V profile.

9. Seat pan according to claim 1, wherein:
   a) the multiple profiles have a widened, flattened top side for accommodating a seat cushion placed thereon.

10. Seat pan according to claim 1, wherein:
    a) at least one flexible area is formed between a circumferential profile and the rear transverse profile to provide deformability of the profile structure via the crossbeam of the seat frame which bends forward, or downward and forward, during a head-on collision.

11. Seat pan according to claim 10, wherein:
    a) the at least one flexible area is formed by a lower vertical height of its profiles.

12. Seat pan according to claim 10, wherein:
    a) the at least one flexible area is formed by a V profile or a horizontal I profile cross section.

13. Seat part arrangement for placement on a seat frame of a vehicle seat, the seat part arrangement comprising:
    a) a seat pan for fastening to the seat frame of a vehicle seat;
    b) the seat pan including:
       i) a profile structure made up of multiple profiles;
       ii) through holes are provided which extend through the profile structure in the vertical direction and which are formed between the multiple profiles; and
       iii) the seat pan having a bottom side, a longitudinal direction, and a transverse direction, and the seat pan on its bottom side having crossbeam receptacles for placement on a crossbeam which extends in the transverse direction; and
    c) a rear subsuspension fastening, and subsuspension springs which extend in the longitudinal direction and which are mounted between the seat pan and the rear subsuspension fastening, and which are spaced apart from one another by spring retainers.

14. Seat part arrangement according to claim 13, wherein:
   a) the seat pan and the rear subsuspension fastening are separate from one another, the seat pan being configured for fixed attachment to the seat frame.

15. Seat part arrangement according to claim 13, wherein:
   a) the seat pan and the rear subsuspension fastening are connected to one another, and the seat pan is adjustable with respect to the seat frame.

16. Vehicle seat according to claim 13, wherein:
   a) the seat pan is height-adjustable or pivotable with respect to the seat frame by a motorized or manual pivoting apparatus.

17. Seat pan for fastening to a seat frame of a vehicle seat, the seat pan comprising:
   a) a profile structure made up of multiple profiles;
   b) the seat pan having a bottom side, a longitudinal direction, and a transverse direction, and the seat pan on its bottom side having crossbeam receptacles for placement on a crossbeam which extends in the transverse direction;
   c) the multiple profiles including a circumferential profile which surrounds the seat pan on three sides and is configured for placement on side profiles of the seat frame;
   d) the circumferential profile being configured as a U profile that is open at the bottom;
   e) the multiple profiles including a rear transverse profile on which front spring connections are provided for accommodating subsuspension springs; and
   f) the multiple profiles including longitudinal profiles and transverse profiles, and a lattice structure is made up of the longitudinal profiles and transverse profiles, between which through holes are formed, and the lattice structure is provided between the circumferential profile and the rear transverse profile.

18. Seat pan for fastening to a seat frame of a vehicle seat, the seat pan comprising:
   a) a profile structure made up of multiple profiles;
   b) the seat pan having a bottom side, a longitudinal direction, and a transverse direction, and the seat pan on its bottom side having crossbeam receptacles for placement on a crossbeam which extends in the transverse direction;
   c) the multiple profiles including a rear transverse profile on which front spring connections are provided for accommodating subsuspension springs;
   d) at least one flexible area being formed between a circumferential profile and the rear transverse profile to provide deformability of the profile structure via the crossbeam of the seat frame which bends forward, or downward and forward, during a head-on collision; and
   e) the at least one flexible area being formed by a lower vertical height of its profiles.

19. Vehicle seat, including a seat frame, and a seat part arrangement, comprising:
   a) the seat part arrangement including:
      i) a seat pan for fastening to the seat frame of the vehicle seat;
      ii) a rear subsuspension fastening, and subsuspension springs which extend in the longitudinal direction and which are mounted between the seat pan and the rear subsuspension fastening, and which are spaced apart from one another by spring retainers;
      iii) the seat pan including:
         1) a profile structure made up of multiple profiles; and
         2) the seat pan having a bottom side, a longitudinal direction, and a transverse direction, and the seat pan on its bottom side having crossbeam receptacles for placement on a crossbeam which extends in the transverse direction;
   b) the seat pan being placed on the crossbeam of the seat frame, and secured in a positive-fit manner by a securing device; and
   c) the rear subsuspension fastening being placed and snap-locked on a rear transverse tube of the seat frame.

* * * * *